US011092774B2

(12) United States Patent
Ikeda

(10) Patent No.: US 11,092,774 B2
(45) Date of Patent: Aug. 17, 2021

(54) LENS APPARATUS, IMAGE CAPTURING APPARATUS, CONTROL METHOD OF LENS APPARATUS, AND CONTROL METHOD OF IMAGE CAPTURING APPARATUS

(71) Applicant: CANON KABUSHIKI KAISHA, Tokyo (JP)

(72) Inventor: Shunichiro Ikeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 16/394,229

(22) Filed: Apr. 25, 2019

(65) Prior Publication Data

US 2019/0331875 A1    Oct. 31, 2019

(30) Foreign Application Priority Data

Apr. 27, 2018    (JP) .............................. JP2018-087542

(51) Int. Cl.
| | |
|---|---|
| G02B 7/09 | (2021.01) |
| G02B 27/64 | (2006.01) |
| G03B 5/00 | (2021.01) |
| G03B 17/12 | (2021.01) |
| H04N 5/232 | (2006.01) |

(52) U.S. Cl.
CPC ............ *G02B 7/09* (2013.01); *G02B 27/646* (2013.01); *G03B 5/00* (2013.01); *G03B 17/12* (2013.01); *H04N 5/23248* (2013.01)

(58) Field of Classification Search
None
See application file for complete search history.

(56) References Cited

U.S. PATENT DOCUMENTS

2013/0163084 A1 * 6/2013 Miyazawa .............. G03B 5/00
                                                         359/554
2014/0184834 A1   7/2014 Miyasako
                        (Continued)

FOREIGN PATENT DOCUMENTS

| CN | 101742098 A | 6/2010 |
|---|---|---|
| CN | 107566719 A | 1/2018 |

(Continued)

OTHER PUBLICATIONS

The above patent documents were cited in a European Search Report dated Sep. 23, 2019, which is enclosed, that issued in the corresponding European Patent Application No. 19169724.2.

(Continued)

*Primary Examiner* — James M Hannett
(74) *Attorney, Agent, or Firm* — Cowan, Liebowitz & Latman, P.C.

(57) ABSTRACT

A lens apparatus used by attaching to an image capturing apparatus comprising one or more processors and/or circuitry which functions as: a vibration detector that detects vibration; a receiver that receives first motion information and reliability information from the image capturing apparatus; an acquisition unit that acquires a correction amount based on second motion information converted from the first motion information using information of the lens apparatus, the vibration detected by the vibration detector, and the reliability information; and an image stabilization unit that performs image stabilization control based on the correction amount.

18 Claims, 6 Drawing Sheets

(56) References Cited

U.S. PATENT DOCUMENTS

| | | | | |
|---|---|---|---|---|
| 2014/0320680 A1* | 10/2014 | Shibata | .............. | H04N 5/23258 |
| | | | | 348/208.3 |
| 2016/0165139 A1* | 6/2016 | Takayanagi | ........ | H04N 5/23261 |
| | | | | 348/208.4 |
| 2018/0020164 A1* | 1/2018 | Yamazaki | .......... | H04N 5/23254 |
| 2019/0058821 A1* | 2/2019 | Lee | .................... | H04N 5/23261 |

FOREIGN PATENT DOCUMENTS

| | | | | |
|---|---|---|---|---|
| EP | 2187626 A1 | * | 5/2010 | ......... H04N 5/23248 |
| EP | 2187626 A1 | | 5/2010 | |
| JP | 3101589 B | | 10/2000 | |
| JP | 4447674 B | | 4/2010 | |
| JP | 2015-045885 A | | 3/2015 | |

OTHER PUBLICATIONS

The above documents were cited in a Nov. 24, 2020 Chinese Office Action, of which is enclosed with an English Translation, that issued in Chinese Patent Application No. 201910344999.4.

* cited by examiner

LENS APPARATUS, IMAGE CAPTURING APPARATUS, CONTROL METHOD OF LENS APPARATUS, AND CONTROL METHOD OF IMAGE CAPTURING APPARATUS

BACKGROUND OF THE INVENTION

Field of the Invention

The present invention relates to a lens apparatus, an image capturing apparatus, and a control method of a lens apparatus and a control method of an image capturing apparatus.

Description of the Related Art

There are known an image capturing device and an interchangeable lens provided with an image stabilization device that detects vibration and drives a movable lens or an image sensor so as to correct image blur caused by the vibration. The image stabilization function of this type is called an optical image stabilization function.

An angular velocity sensor (gyro sensor) is generally used as a method of detecting vibration, and the lens or the image sensor is driven in a direction to cancel the vibration based on detected angular velocity. In recent years, as a frame rate and image processing speed of an image capturing apparatus increase, there has been also known a technique of analyzing shifts between frames of images and calculating a motion vector to detect vibration.

Japanese Patent No. 4447674 discloses an image capturing apparatus that transfers a motion amount obtained by motion detection means of the camera main body to the lens unit at a predetermined timing. In this image capturing apparatus, during zooming operation of the variable magnification optical system of the lens unit, control means of the camera unit controls to stop the operation of the motion detection means or to set the input or output to the motion detection means to 0, or to ignore the output of the motion detection means. Then, shake information is processed based only on a shake amount detected by the lens unit.

Also, Japanese Patent No. 3101589 discloses the following interchangeable lens type camera system. First, the movement of images is detected using the image signal on the camera main body, and movement correction information for correcting the movement of the images is transmitted to the lens unit in synchronization with the vertical synchronization signal. The lens unit receives the movement correction information in synchronization with the vertical synchronization signal, converts it into a drive signal for driving the correction means for correcting the movement of the image, and supplies it to the correction means.

In a case of sending motion information from the camera main body to the lens unit, if it is attempted to transmit motion information that reflects the current information of the lens unit (current focal length information, zoom state, etc.), there arise problems such that accuracy deteriorates due to a time lag caused by lens communication for acquiring lens unit information, and that tuning suitable for each lens becomes difficult.

In Japanese Patent No. 4447674, the control of the motion detection means is changed in the camera body during the zooming operation of the variable magnification optical system of the lens unit. However, since determination on this change of control requires information on the magnification changing operation of the variable magnification optical system of the lens unit, the accuracy of the information on the lens unit is reduced due to a time lag caused by lens communication with the lens unit.

In addition, in Japanese Patent No. 3101589, movement correction information is transmitted from the camera main body to the lens unit, and the lens unit converts it into a drive signal for driving the correction means. Here, since the image stabilization characteristics are different depending on the type of the lens, it is difficult to perform tuning suitable for each lens on the camera body.

SUMMARY OF THE INVENTION

The present invention has been made in consideration of the above situation, and, when performing image stabilization control using an anti-vibration unit of a lens unit attached to a camera main body, reduces deterioration of accuracy due to a time lag caused by lens communication for acquiring current information of the lens unit, thereby improving a degree of freedom of image stabilization control in the lens unit.

According to the present invention, provided is a lens apparatus used by attaching to an image capturing apparatus comprising one or more processors and/or circuitry which functions as: a vibration detector that detects vibration; a receiver that receives first motion information and reliability information from the image capturing apparatus; an acquisition unit that acquires a correction amount based on second motion information converted from the first motion information using information of the lens apparatus, the vibration detected by the vibration detector, and the reliability information; and an image stabilization unit that performs image stabilization control based on the correction amount.

Further, according to the present invention, provided is a lens apparatus used by attaching to an image capturing apparatus comprising one or more processors and/or circuitry which functions as: a vibration detector that detects vibration; a receiver that receives first motion information from the image capturing apparatus; an acquisition unit that acquires a correction amount based on second motion information converted from the first motion information using information of the lens apparatus and the vibration detected by the vibration detector; and an image stabilization unit that performs image stabilization control based on the correction amount, wherein the receiver receives first background motion information and first subject motion information as the first motion information, and information relating to set image stabilization mode from the image capturing apparatus, and wherein the acquisition unit determines which of second background motion information converted from the first background motion information and second subject information converted from the first subject motion information is to be used as the second motion information based on the information relating to the image stabilization mode received by the receiver.

Furthermore, according to the present invention, provided is an image capturing apparatus comprising one or more processors and/or circuity which functions as: an imaging unit; a motion detector that detects a motion vector which represents a moving amount of image between a plurality of images captured by the imaging unit by a number of pixels that form the imaging unit; a converter that converts the motion vector into first motion information based on information of the imaging unit; and an output unit that outputs the first motion information and reliability information of the first motion information to a lens apparatus.

Further, according to the present invention, provided is an image capturing apparatus capable of connecting to a detachable lens apparatus comprising one or more processors and/or circuitry which functions as: an imaging unit; a motion detector that detects a motion vector which represents a moving amount of image between a plurality of images captured by the imaging unit by a number of pixels that form the imaging unit; a converter that converts the motion vector into first motion information based on information of the imaging unit; an output unit that outputs the first motion information to the lens apparatus; and a switching unit that switches between a first image stabilization mode and a second image stabilization mode, wherein the motion detector detects a movement of background in the image captured by the imaging unit and a movement of a subject in the image, the converter obtains a first background motion information converted from the movement of the background based on the information of the imaging unit and a first subject motion information converted from the movement of the subject based on the information of the imaging unit as the first motion information, and the output unit outputs the first background motion information and the subject motion information to the lens apparatus as the first motion information.

Further, according to the present invention, provided is an image capturing apparatus capable of connecting to a detachable lens apparatus comprising one or more processors and/or circuitry which functions as: an imaging unit; a motion detector that detects a motion vector which represents a moving amount of image between a plurality of images captured by the imaging unit by a number of pixels that form the imaging unit; and an output unit that outputs motion information including the motion vector, a distance between pixels, and a frame rate at which the images are captured and reliability information of the motion information to the lens apparatus.

Further, according to the present invention, provided is a control method of a lens apparatus used by attaching to an image capturing apparatus comprising: detecting vibration; receiving first motion information and reliability information from the image capturing apparatus; acquiring a correction amount based on second motion information converted from the first motion information using information of the lens apparatus, the detected vibration, and the reliability information; and performing image stabilization control based on the correction amount.

Further, according to the present invention, provided is a control method of a lens apparatus used by attaching to an image capturing apparatus comprising: detecting vibration; receiving first background motion information and first subject motion information from the image capturing apparatus as first motion information; receiving information relating to set image stabilization mode from the image capturing apparatus; acquiring a correction amount based on second motion information converted from the first motion information using information of the lens apparatus and the detected vibration; and performing image stabilization control based on the correction amount, wherein, upon acquiring the correction amount, which of second background motion information converted from the first background motion information and second subject information converted from the first subject motion information is to be used as the second motion information is determined based on the received information relating to the image stabilization mode.

Further, according to the present invention, provided is a control method of an image capturing apparatus comprising: detecting a motion vector which represents a moving amount of image between a plurality of images captured by an imaging unit by a number of pixels that form the imaging unit; converting the motion vector into first motion information based on information of the imaging unit; and outputting the first motion information and reliability information of the first motion information to a lens apparatus.

Further, according to the present invention, provided is a control method of an image capturing apparatus capable of connecting to a detachable lens apparatus comprising: detecting a movement of background in an image captured by an imaging unit and a movement of a subject in the image, and detecting a motion vector which represents a moving amount of image between a plurality of images by a number of pixels that form the imaging unit; converting the motion vector into first motion information based on information of the imaging unit; outputting the first motion information to the lens apparatus; and switching between a first image stabilization mode and a second image stabilization mode, wherein the first motion information includes a first background motion information converted from the movement of the background based on the information of the imaging unit and a first subject motion information converted from the movement of the subject based on the information of the imaging unit, and the first background motion information and the subject motion information are output to the lens apparatus as the first motion information.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. First, items common to the respective embodiments will be described.

Figure 1:
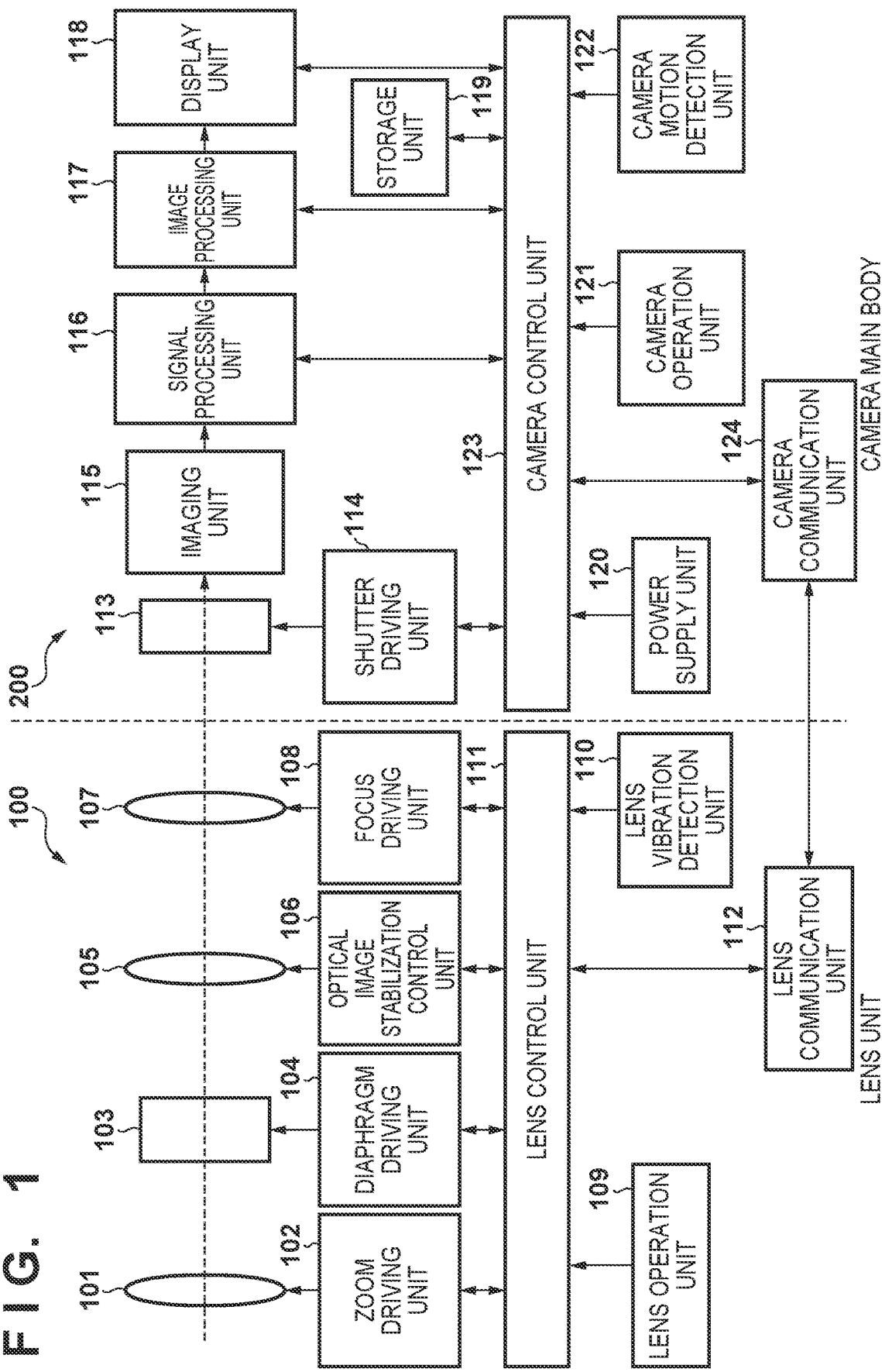
FIG. 1 is a block diagram showing a configuration example of an image capturing system according to an embodiment of the present invention.

FIG. 1 is a block diagram showing a configuration of an image capturing system according to an embodiment of the present invention. As an example, the image capturing system according to the present embodiment is a lens interchangeable digital camera mainly for capturing still images and moving images. It should be noted that the present invention can be applied not only to a digital camera, but also to various image capturing systems.

The image capturing system shown in FIG. 1 is composed of a lens unit 100 and a camera main body 200 as the image capturing apparatus, and the lens unit 100 is mounted on the camera main body 200 so as to be detachable and communicable.

In the lens unit 100, a zoom lens 101 moves in the optical axis direction to perform zooming. A zoom driving unit 102 drives the zoom lens 101 upon receiving a command from a lens control unit 111 described later. A diaphragm 103 adjusts the amount of light by changing its aperture diameter. A diaphragm driving unit 104 drives the diaphragm 103 upon receiving a command from the lens control unit 111. A shift lens (hereinafter referred to as "correction lens") 105 as an image stabilization optical element performs optical image stabilization for reducing image blur by shifting in a direction perpendicular to the optical axis. Upon receiving a command from the lens control unit 111, an optical image stabilization control unit 106 controls shift driving of the correction lens 105, that is, optical image stabilization. The optical image stabilization control unit 106 and the correction lens 105 constitute an image stabilization unit in the lens unit 100.

Further, focus adjustment is performed by moving a focus lens 107 in the optical axis direction. A focus driving unit 108 receives a command from the lens control unit 111 and controls driving of the focus lens 107. The zoom lens 101, the diaphragm 103, the correction lens 105, and the focus lens 107 constitute an imaging optical system.

A lens operation unit 109 has various switches and the like operated by a user. A lens vibration detection unit 110 detects the lens vibration (angular velocity) such as camera shake applied to the lens unit 100, and outputs a lens vibration signal representing lens vibration to the lens control unit 111. The lens control unit 111 includes a CPU and the like and controls the operation of the entire lens unit 100. Further, the lens control unit 111 communicates with a camera control unit 123 of the camera main body 200 via a lens communication unit 112 provided in the lens unit 100 and a camera communication unit 124 provided in the camera main body 200. The lens communication unit 112 and the camera communication unit 124 have a communication circuit that enables communication of notification and information (data) between the lens control unit 111 and the camera control unit 123 via a plurality of communication channels.

In the camera main body 200, a shutter driving unit 114, which receives a command from the camera control unit 123, drives a shutter 113 to open and close so as to control the exposure of an imaging unit 115. The imaging unit 115 includes an image sensor such as a CMOS sensor, photoelectrically converts a subject image formed by the imaging optical system, and outputs an electric signal (image signal). A signal processing unit 116 performs various video processing on the image signal output from the imaging unit 115 to generate a video signal. An image processing unit 117 performs processing according to its purpose of the video signal.

A display unit 118 displays an image based on the video signal output from the image processing unit 117. A storage unit 119 records various data such as video signals. A power supply unit 120 supplies power to the entire camera main body 200 and the lens unit 100. A camera operation unit 121 includes various switches operated by the user and outputs an operation signal corresponding to the operation to the camera control unit 123.

A camera motion detection unit 122 detects vibration such as camera shake applied to the camera main body 200 as a motion vector obtained by analyzing inter-frame images (video signals), and outputs a camera motion signal corresponding to the camera shake to the camera control unit 123. The motion vector detected here is represented by the number of pixels constituting the image sensor of the imaging unit 115. The camera control unit 123 has a CPU and controls the entire image capturing system. The camera control unit 123 communicates with the lens communication unit 112 of the lens unit 100 via the camera communication unit 124. That is, in a state in which the lens unit 100 is attached to the camera main body 200 and is electrically connected, mutual communication is performed via the lens communication unit 112 and the camera communication unit 124.

Next, the operation of the image capturing system configured as described above will be described. The lens operation unit 109 includes an optical image stabilization switch capable of selecting on/off of optical image stabilization by the optical image stabilization control unit 106. When the user turns on the optical image stabilization switch, the lens control unit 111 or the camera control unit 123 instructs the optical image stabilization control unit 106 to start the image stabilization operation. Upon receiving this instruction, the optical image stabilization control unit 106 performs control of the optical image stabilization operation (image stabilization control) using the correction lens 105 until the user turns off the optical image stabilization switch.

The camera operation unit 121 includes an image stabilization mode selection switch that allows the user to select a normal image stabilization mode and an object image stabilization mode as image stabilization. The normal image stabilization mode is an image stabilization mode in which image stabilization processing is performed according to the movement of the camera, and the object image stabilization mode is an image stabilization mode in which image stabilization processing is performed according to the movement of the subject.

The camera operation unit 121 includes a shutter release switch in which the first switch SW1 and the second switch SW2 are sequentially turned on in accordance with the pushing amount. The first switch SW1 is turned on in accordance with a first stroke (for example, half-pressed) of the shutter release switch by the user, and the second switch SW2 is turned on in accordance with the second stroke (for example, full press) of the shutter release switch. The camera control unit 123 performs autofocus processing by driving the focus lens 107 through the lens control unit 111 and the focus driving unit 108 in response to the turning on of the first switch SW1. Also, based on luminance information acquired from a video signal, the diaphragm 103 is driven by the lens control unit 111 and the diaphragm driving unit 104 to properly adjust the light amount. Then, in response to the second switch SW2 being turned on, the camera control unit 123 controls the imaging unit 115 to perform photoelectric conversion of the subject image and controls the signal processing unit 116 to generate a video signal (video data). At this time, if the optical image stabilization switch is on, the optical image stabilization is performed as described above. The video data generated in this manner is recorded in the storage unit 119.

The camera operation unit 121 also includes a moving image recording switch. When this moving image recording switch is operated by the user, the camera control unit 123 starts recording a moving image, and when the moving image recording switch is operated again by the user during the recording, the recording of the moving image is ended. Further, if the user operates the shutter release switch to turn on the first switch SW1 and the second switch SW2 during recording a moving image, a process of acquiring a still image from the moving image being recorded and recording it in the storage unit 119 is executed. Further, the camera operation unit 121 includes a reproduction mode selection switch capable of selecting a reproduction mode. When the reproduction mode is selected by the operation of the reproduction mode selection switch, the camera control unit 123 stops the image stabilization control.

Figure 2:
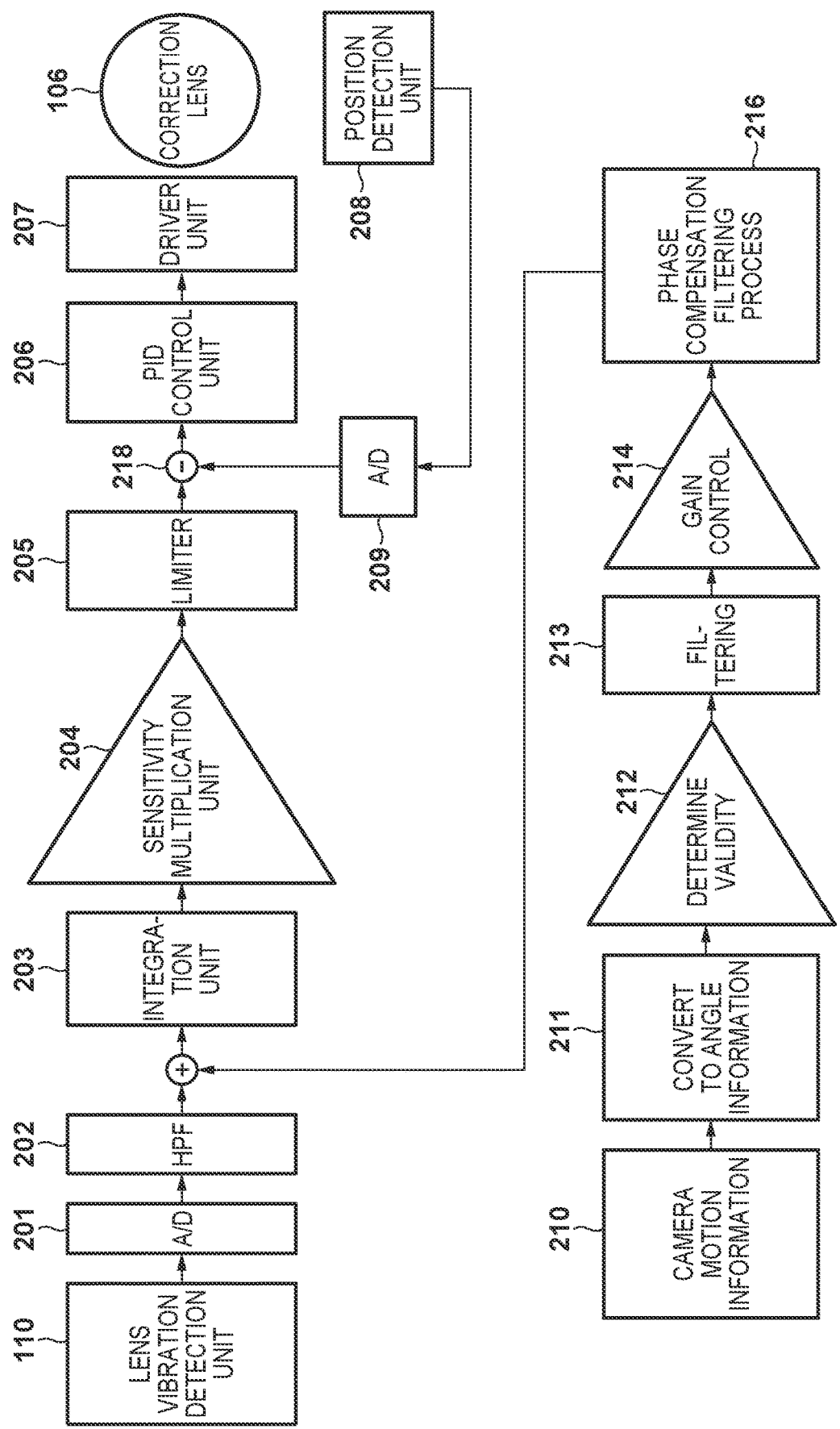
FIG. 2 is a block diagram showing a functional configuration of optical image stabilization of a lens unit according to the embodiment.
Figure 3:
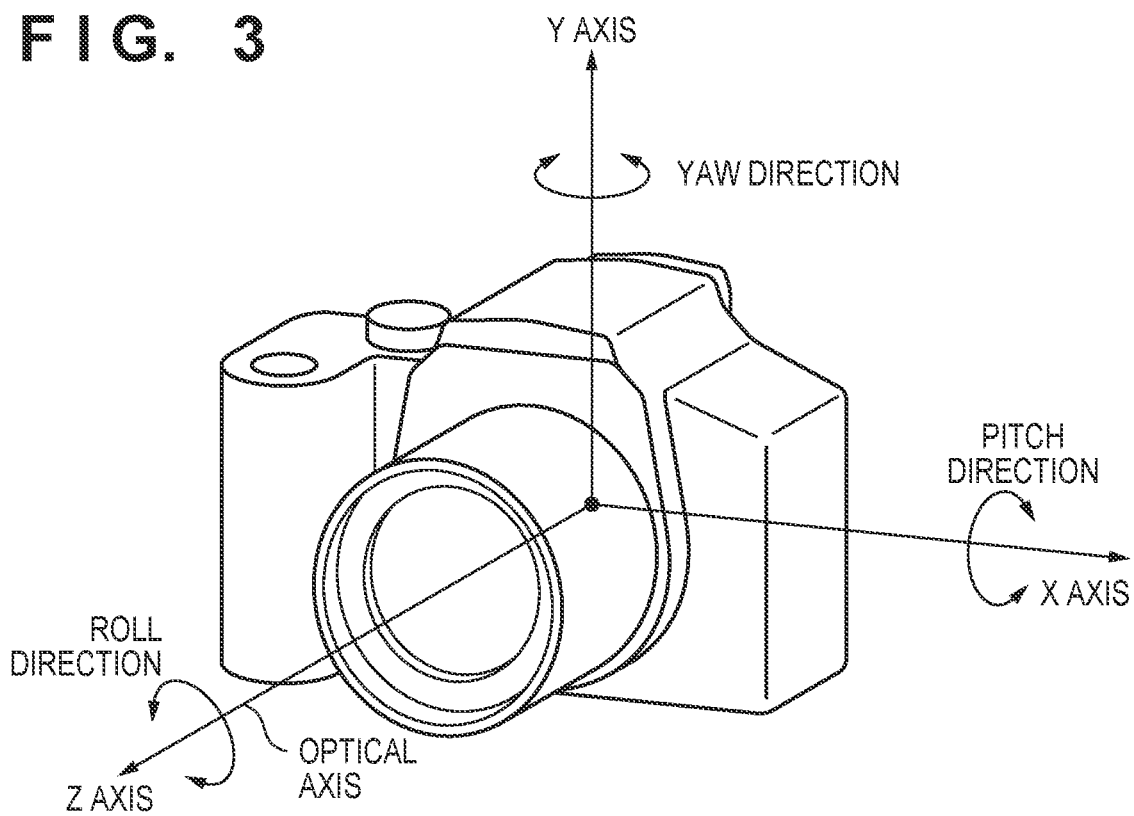
FIG. 3 is a view for explaining a pitch direction, a yaw direction, and a roll direction of a camera body.

Next, the image stabilization control performed in the image capturing system of this embodiment will be described with reference to FIGS. 2 and 3. FIG. 2 is a block diagram showing a configuration relating to image stabilization control in the configuration of the lens unit 100. FIG. 3 shows a pitch direction, a yaw direction and a roll direction in the image capturing system. As shown in FIG. 3, in the camera main body 200, the optical axis of the imaging optical system is defined as the Z axis, the vertical direction at the upright position of the camera main body 200 is defined as the Y axis, and the direction orthogonal to the Y axis and the Z axis is defined as the X axis. The pitch direction is around the X axis (tilt direction), the yaw direction is around the Y axis (pan direction), and the roll direction is around the Z axis (the imaging surface rotates in a plane orthogonal to the optical axis). In other words, the pitch direction is a direction inclined in the direction perpendicular to the horizontal plane, the yaw direction is the direction inclined in the horizontal direction with respect to the vertical plane, and they are orthogonal to each other. Among these directions, in the present embodiment, image stabilization control in the pitch direction and the yaw direction using the correction lens 105 will be explained.

In FIG. 2, the lens vibration detection unit 110 detects an angular velocity using a gyro sensor as a vibration sensor, and outputs a lens vibration signal having a voltage corresponding to the angular velocity.

The lens vibration detection unit 110 has a pitch vibration sensor and a yaw vibration sensor (not shown), and outputs a lens vibration signal in each direction.

The configuration after the lens vibration detection unit 110 is provided for the pitch direction and the yaw direction respectively. The pitch vibration signal corresponding to the vibration in the pitch direction from the pitch vibration sensor and the yaw vibration signal corresponding to the vibration in the yaw direction from the yaw vibration sensor, both in the lens vibration detection unit 110, are sent to an A/D converter 201 as the lens vibration signal. Since the configuration for the image stabilization control shown in FIG. 2 is the same for the pitch direction and the yaw direction, only the configuration for either direction will be described below.

The A/D converter 201 converts the lens vibration signal from the lens vibration detection unit 110 into angular velocity data as a digital signal. A high pass filter (HPF) 202 removes the offset component and the temperature drift component of the angular velocity data and outputs the result.

Meanwhile, camera motion information 210 is transmitted from the camera communication unit 124 to the optical image stabilization control unit 106 via the lens communication unit 112. The camera motion information 210 includes an image plane movement amount and reliability information obtained from the camera motion detection unit 122 as described later.

The optical image stabilization control unit 106 performs the following processing on the received camera motion information 210 and adds it to the lens vibration signal. First, the optical image stabilization control unit 106 converts the image plane movement amount of the camera motion information 210 into angle information using the focal length information of the lens obtained by the zoom driving unit 102 (211). Subsequently, based on the reliability information of the camera motion information 210, it is determined whether the camera motion information can be used (212), the determination result is input to a filter, a filtering process is performed (213), and gain control (weighting) is performed (214) in accordance with the lens control state. Finally, phase compensation is performed using a phase compensation filter 216, and the output is added to the angular velocity data output from the high-pass filter 202. The processing in 211 to 213 will be described in detail later with reference to FIG. 5.

The added signal is input to an integration unit 203. The integration unit 203 performs pseudo integration mainly by a low-pass filter, and integrates the angular velocity data to convert into angular displacement data. A sensitivity multiplication unit 204 converts the angular displacement data obtained by the integration unit 203 into an optical image stabilization correction amount using sensitivity. This sensitivity has a different value for each focal length, and its value is changed each time the focal length of the imaging optical system changes. In addition, the sensitivity also reflects the correction amount by sensitivity adjustment of the gyro sensor, thereby absorbing variations in sensitivity of the gyro sensor.

A limiter 205 limits (clamps) the optical image stabilization correction amount within the movable range of the correction lens 105. This makes it possible to prevent the correction lens 105 from reaching and being fixed to the end of its movable range. The output of the limiter 205 is input to a subtractor 218, and the output from the subtractor 218 is input to a PID control unit 206.

The PID control unit 206 performs position control of the correction lens 105 in response to an input from the subtractor 218. The position control is performed by a combination of P (proportional) control, I (integral) control, and D (differential) control. A driver unit 207 supplies a current for driving the correction lens 105 corresponding to a control signal from the PID control unit 206 corresponding to the optical image stabilization correction amount to an image stabilization actuator (voice coil motor or the like) (not shown) in the driver unit 207.

A position detection unit 208 detects the position of the correction lens 105 and outputs a position detection signal having a voltage corresponding to the position. An A/D converter 209 converts the position detection signal, which is an analog signal from the position detection unit 208, into a digital signal and outputs it to the subtractor 218 as position detection data. The subtractor 218 calculates the difference (deviation) between the output from the limiter 205 and the output from the A/D converter 209, and outputs the result to the PID control unit 206. As a result, feedback position control of the correction lens 105 is performed.

First Embodiment

Figure 4:
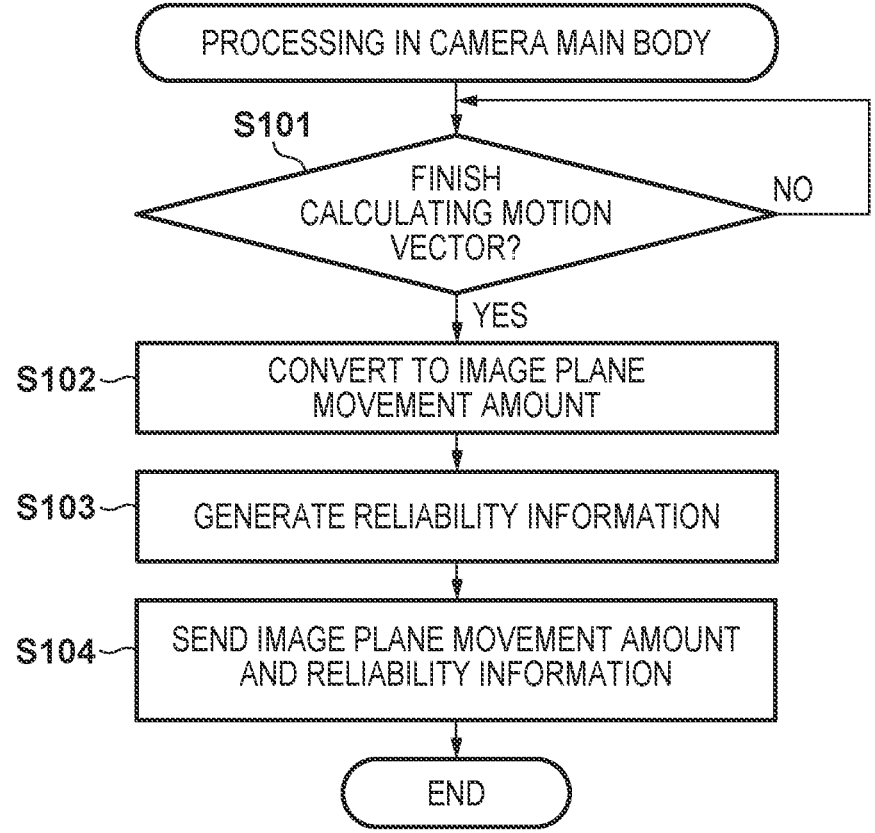
FIG. 4 is a flowchart showing motion information generation and communication processing in a camera main body according to a first embodiment.
Figure 5:
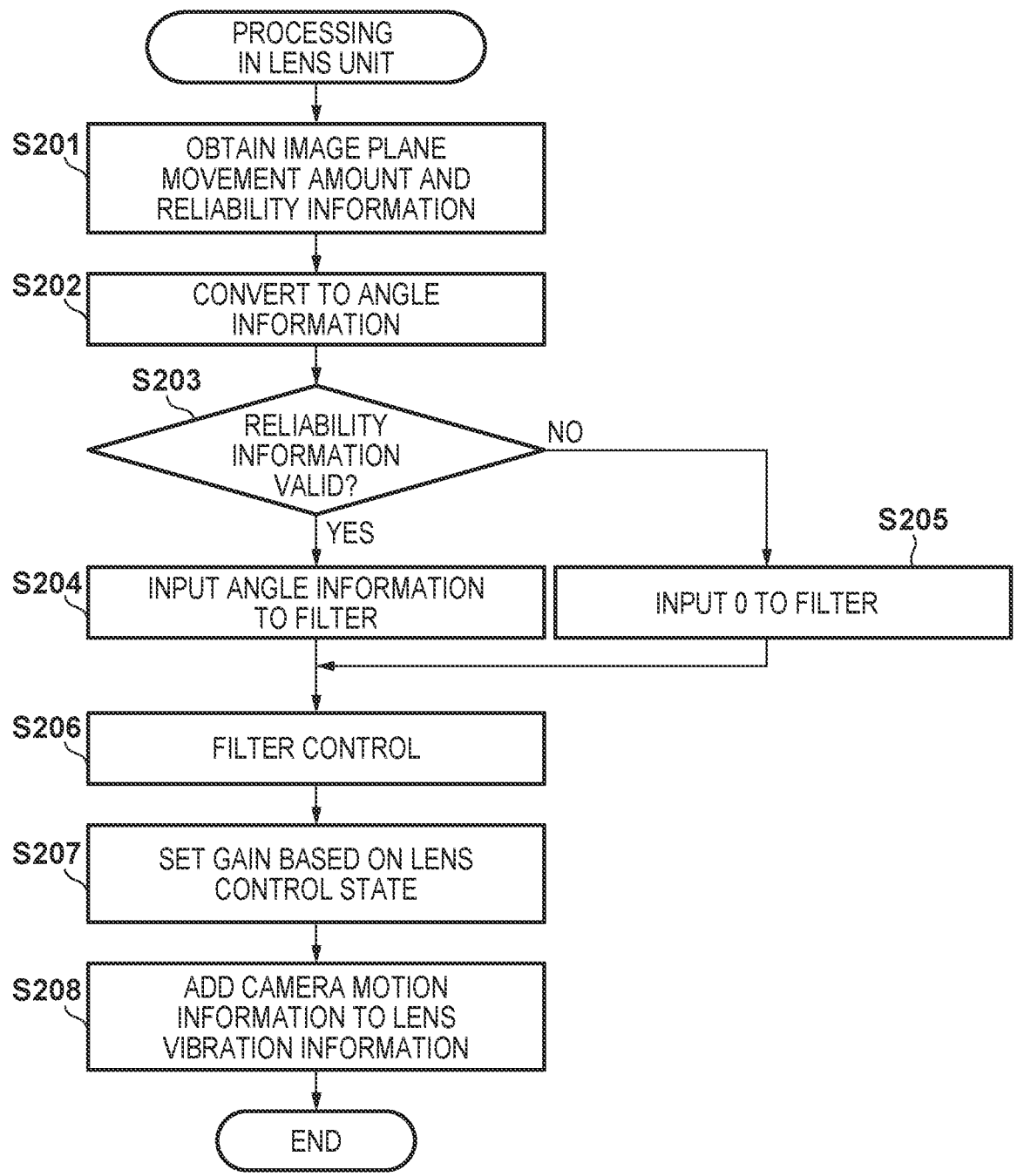
FIG. 5 is a flowchart showing image stabilization control in the lens unit and communication control between the lens unit and the camera main body according to the first embodiment.

Next, a first embodiment of the present invention will be described with reference to FIGS. 4 and 5. FIG. 4 is a flowchart showing motion information generation and communication processing performed by the camera control unit 123 in the camera main body 200. FIG. 5 is a flow chart showing communication and image stabilization processing performed by the lens control unit 111 in the lens unit 100. A camera control unit 123 and a lens control unit 111 configured as a computer such as a CPU execute these processes according to a communication and image stabilization control program as a computer program.

In step S101 of FIG. 4, the camera control unit 123 determines whether motion vector calculation process has ended in the camera motion detection unit 122. If the calculation process is completed, the process proceeds to step S102, and if not completed, the determination of step S101 is repeated.

Next, in step S102, the camera control unit 123 converts pixel information of the motion vector obtained in step S101, to image plane movement amount using the frame rate information of the image capturing mode which is information of the imaging unit 115 stored in the camera main body 200, and cell pitch information of the image sensor of the imaging unit 115. The frame rate represents a time interval for detecting a motion vector, that is, an interval at which a plurality of images used for detecting a motion vector are obtained, and the cell pitch indicates a length between pixels constituting the image sensor. From these pieces of information, it is possible to convert the motion vector [pix] represented by pixels into image plane movement amount [μm/sec].

In the next step S103, the camera control unit 123 generates reliability information corresponding to the image plane movement amount converted in step S102. The reliability information is information generated from error information of motion vectors generated in the camera motion detection unit 122 and a transition of camera motion information.

Finally, in step S104, the camera control unit 123 transmits the image plane movement amount (motion information) and reliability information as camera motion information to the lens control unit 111.

On the other hand, in step S201 of FIG. 5, the lens control unit 111 acquires the image plane movement amount and reliability information as the camera motion information from the camera control unit 123. Next, in step S202, the lens control unit 111 converts the image plane movement amount acquired in step S201 into angle information using focal length information that is information of the lens unit 100. This process corresponds to the process 211 of FIG. 2.

Next, in step S203, the lens control unit 111 determines the reliability information acquired in step S201. The reliability information includes the error information of motion vectors and information generated from the transition of camera motion information. This reliability information is used to determine whether the image plane movement amount can be used. This process corresponds to the process 212 in FIG. 2. Further, whether the image plane movement amount can be used or not may be determined by judging the state of zooming by the zoom driving unit 102 which is the information of the lens unit 100. If it is determined that the image plane movement amount can be used, the process proceeds to step S204, and if not, the process proceeds to step S205.

In step S204, the lens control unit 111 reflects the angle information converted in step S202 in the filter input. On the other hand, in step S205, since it is determined in step S203 that the image plane movement amount cannot be used, the filter input of the angle information is set to 0. This process corresponds to the process 213 in FIG. 2.

Next, in step S206, the lens control unit 111 performs filter control based on the angle information input to the filter in step S204 or S205. The filter control mentioned here is control to lower the gain to ease the reflection if the information input to the filter is a large output more than necessary or if there is a sudden change from the previous value. This tuning is possible in each lens. This process corresponds to the process 214 in FIG. 2.

In step S207, the lens control unit 111 further performs gain setting according to the control state of the lens unit 100. For example, the lens control unit 111 controls the gain (weighting) to reflect camera motion information according to the control state of the lens that can be determined using information on the lens unit 100, such as fixed-point shooting on the telephoto side and shooting in the macro region.

In step S208, the lens control unit 111 processes the camera motion information from the camera main body 200, processed as described above, with a phase compensation filter, and adds the result to the lens vibration signal of the lens unit 100 output from the HPF 202, then the process ends.

As described above, in the first embodiment, in the camera main body 200, the motion vector information is converted into image plane movement amount using information of the imaging unit 115 included in the camera main body 200, added with reliability information, and transmitted to the lens unit 100. In the present embodiment, the information of the imaging unit 115 is information of a frame rate and a cell pitch.

On the other hand, in the lens unit 100, the information on the image plane movement amount acquired from camera main body 200 is converted into the angle information using the focal length which is the information in the lens unit 100, and whether the camera motion information can be used is determined using the reliability information. Furthermore, the gain is controlled in accordance with the control state of the lens unit 100, and the motion information of the camera main body 200 is added to the vibration information in the lens unit 100.

As described above, according to the first embodiment, each of the camera main body 200 and the lens unit 100 generates information using only its own information, and transmits the generated information, thereby avoiding an accuracy drop associated with the lens communication time lag. Further, by sending the motion information which is independent of the information on the lens unit from the camera main body 200 to the lens unit 100, it is possible to improve the degree of freedom of control in the lens unit. Furthermore, by adding reliability information to the information of the image plane movement amount, it is possible to control how to reflect the camera motion information in the lens unit 100. In addition, by adding the control state of the lens unit 100, it becomes possible to perform tuning suitable to each lens in the lens unit 100.

Further, in the first embodiment, in the camera main body 200, a motion vector is converted to an image plane movement amount using the frame rate and the cell pitch information which are information of the camera main body 200 and transmitted to the lens unit 100. However, the present invention is not limited to this, and the frame rate and cell pitch information may be transmitted to the lens unit 100 together with the motion vector (motion information), and the lens unit 100 may convert the motion vector into the image plane movement amount. The cell pitch information is information uniquely determined in accordance with the image sensor, and the frame rate is basically the same in the same drive mode. Communication of these pieces of information may be performed at the same timing as the motion information, or may be performed at another timing.

Second Embodiment

Figure 6:
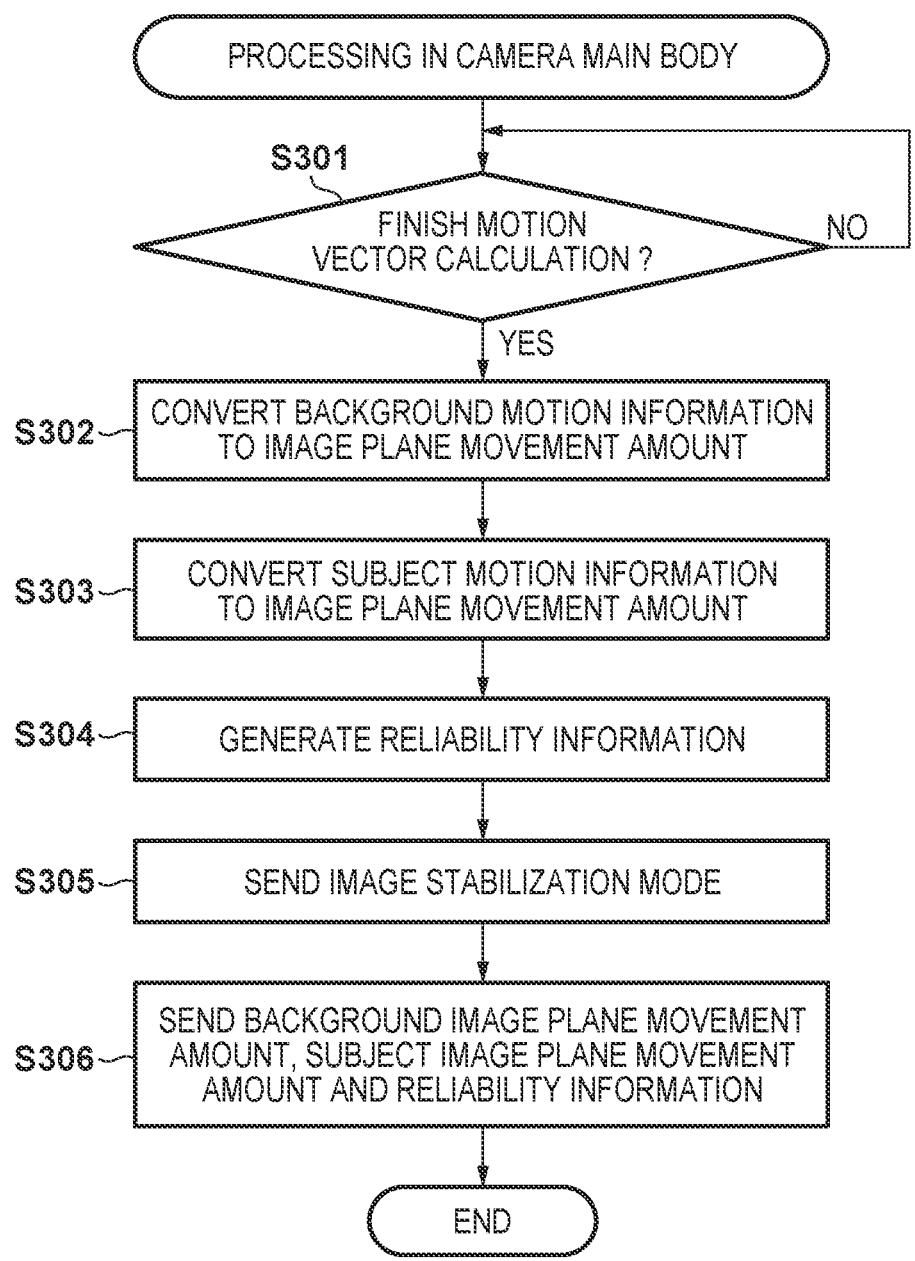
FIG. 6 is a flowchart showing motion information generation and communication processing in the camera main body according to a second embodiment.

Next, a second embodiment of the present invention will be described with reference to FIG. 6 and FIG. 7. FIG. 6 is a flowchart showing motion information generation and communication processing performed by the camera control unit 123 in the camera main body 200. The configuration of the image capturing system in the second embodiment is the same as that described in the first embodiment with reference to FIGS. 1 to 3, and thus the description thereof is omitted.

In the first embodiment, the image plane movement amount and reliability information are transmitted as the camera motion information from the camera control unit 123 to the lens control unit 111, and in the lens unit 100, the camera motion information is converted into the angle information using to the lens information of the lens unit 100. In this way, the camera motion information is reflected according to the control state of the lens unit 100. On the other hand, in the second embodiment, the camera main body 200 calculates two pieces of motion information of background motion information and subject motion information, and the lens unit 100 control to reflect either of the two pieces of motion information according to the set image stabilization mode.

FIG. 6 is a flowchart showing the motion information generation and communication processing performed by the camera control unit 123 in the camera main body 200. FIG. 7 is a flow chart showing the communication and image stabilization processing performed by the lens control unit 111 in the lens unit 100. Similarly to the first embodiment, the camera control unit 123 and the lens control unit 111 configured as a computer such as a CPU execute these processes according to a communication and image stabilization control program as a computer program.

In step S301 of FIG. 6, the camera control unit 123 determines whether the motion vector calculation process has ended in the camera motion detection unit 122. If the calculation processing has been completed, the process proceeds to step S302, and if not, the determination of step S301 is repeated.

Next, in step S302, the camera control unit 123 converts background motion information of the pixel information of the motion vector obtained in step S301 into an image plane movement amount. The background motion information is obtained by performing histogram processing or the like on the information of motion vectors, and represents movement of the camera main body 200. As in the first embodiment, the background motion information is converted to the image plane movement amount information using frame rate information of the image capturing mode and cell pitch information of the image sensor, which are information of the camera main body 200. Hereinafter, this image plane movement amount is referred to as "background image plane movement amount".

In step S303, the camera control unit 123 converts object motion information of the pixel information of the motion vector obtained in step S301 into an image plane movement amount. The subject motion information is motion information different from the background motion information obtained in step S302, and represents the motion of the subject in lens unit 100. Here, as in the first embodiment, the subject motion information is converted to the image plane movement amount information using frame rate information of the image capturing mode and cell pitch information of the imaging sensor, which are information of the camera main body 200. Hereinafter, this image plane movement amount is referred to as "object image plane movement amount".

In the next step S304, the camera control unit 123 generates reliability information corresponding to the motion information of the background image plane movement amount and the subject image plane movement amount. The reliability information includes error information of the motion vector generated in the camera motion detection unit 122 and information generated from the transition of the camera motion information.

In step S305, the camera control unit 123 transmits the image stabilization mode set by the camera operation unit 121 to the lens control unit 111. As described above, the image stabilization mode in the second embodiment is either of the normal image stabilization mode in which the image stabilization processing is performed in accordance with the movement of the camera main body 200 and the object image stabilization mode in which the image stabilization processing is performed is performed in accordance with the movement of the subject.

Finally, in step S306, the camera control unit 123 transmits the background image plane movement amount, the subject image plane movement amount, and the reliability information to the lens control unit 111 as the camera motion information.

Figure 7:
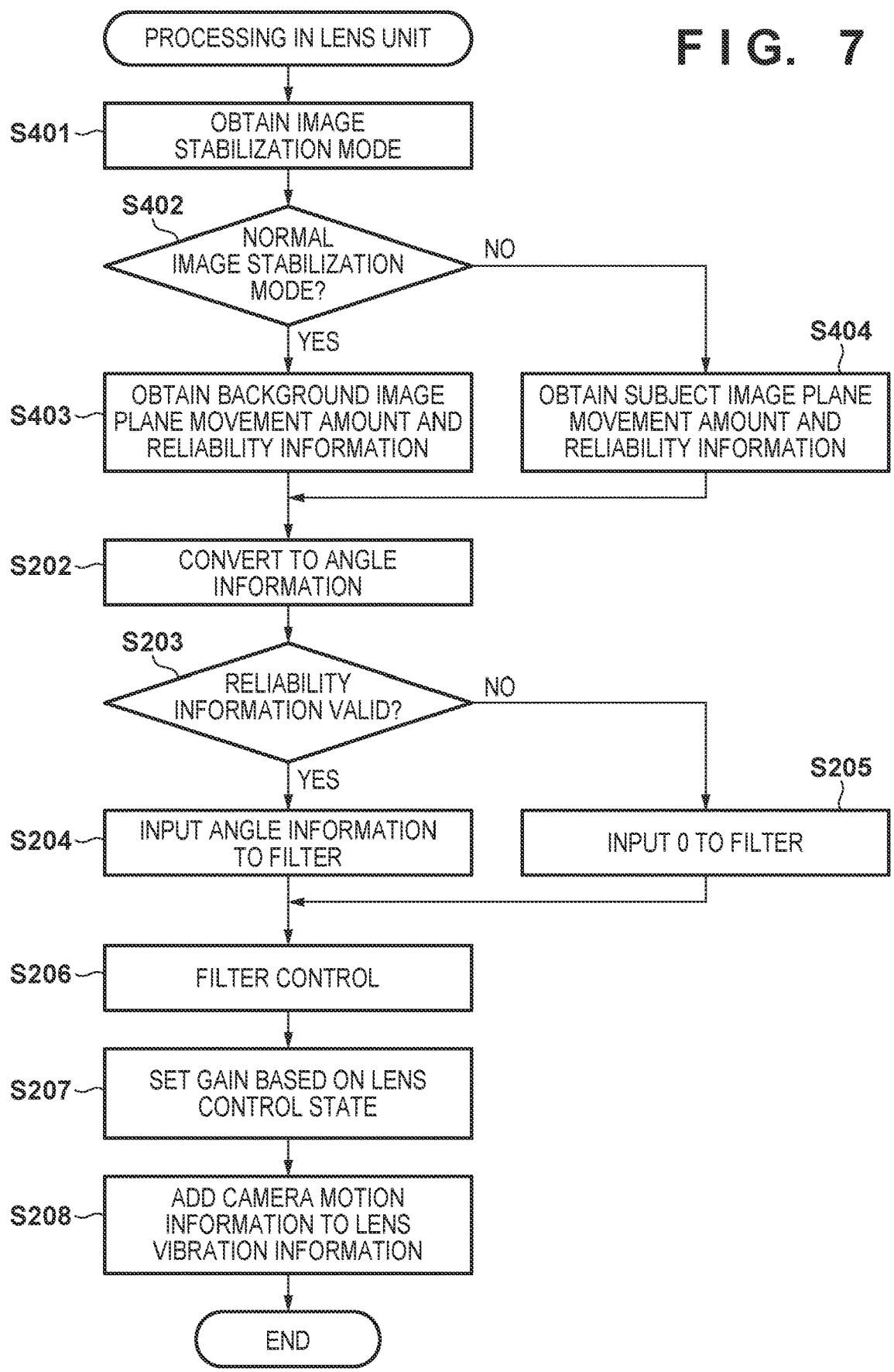
FIG. 7 is a flowchart showing image stabilization control in the lens unit and communication control between the lens unit and the camera main body according to the second embodiment.

On the other hand, in step S401 of FIG. 7, the lens control unit 111 acquires the image stabilization mode from the camera control unit 123. Next, in step S402, the lens control unit 111 determines whether the image stabilization mode acquired in step S401 is the normal image stabilization mode. If it is the normal image stabilization mode, the process proceeds to step S403, and if it is not the normal image stabilization mode but the object image stabilization mode, the process proceeds to step S404.

In step S403, the lens control unit 111 determines that the normal image stabilization mode is selected in step S402, and thus acquires the background image plane movement amount and reliability information from the camera control unit 123.

On the other hand, in step S404, since the lens control unit 111 determines that the object image stabilization mode is selected in step S402, and thus acquires the subject image plane movement amount and reliability information from the camera control unit 123.

After the necessary information is acquired in step S403 or S404, the same processing as the processing of S202 onward in FIG. 5 is performed, and the description is omitted here.

As described above, in the second embodiment, transmission of two types of motion information of the background motion information and the subject motion information detected by the camera main body 200 is performed between the lens control unit 111 and the camera control unit 123. The camera main body 200 transmits the setting information of the image stabilization mode, and the lens obtains the corresponding image plane movement amount according to the image stabilization mode, and adds the motion information of the camera main body to the image stabilization control in the lens.

As a result, in the second embodiment, in addition to the fact that image stabilization control reflecting subject motion information, which is difficult to determine in the lens unit 100 alone, becomes possible, the lens unit 100 controls to switch motion information. Accordingly, it becomes possible to tune the transition of control suitable to each lens in the lens unit 100 at the time of largely switching image stabilization control, such as at the time of image stabilization mode switching.

Also, as in the first embodiment, in the second embodiment, the motion vector is converted into an image plane movement amount in the camera main body 200 using the frame rate and the cell pitch information, which are information of the camera main body 200, and transmitted to the lens unit 100. However, the present invention is not limited to this, and the frame rate and cell pitch information may be transmitted to the lens unit 100 together with the motion vector (motion information), and the lens unit 100 may convert the motion vector into the image plane movement amount. Communication of these pieces of information may be performed at the same timing as the motion information, or may be performed at another timing.

Furthermore, with regard to communication in the image stabilization mode, communication may be performed at the same timing as the motion information, or may be performed at a different timing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-087542, filed on Apr. 27, 2018 which is hereby incorporated by reference herein in its entirety.

What is claimed is:

1. A lens apparatus configured to be attached to an image capturing apparatus, the lens apparatus comprising:
    an imaging optical system; and
    one or more processors and/or circuitry which functions as:
        a vibration detector that detects vibration;
        a receiver configured to receive, from the image capturing apparatus, first motion information and reliability information;
        a conversion unit that converts the first motion information to second motion information in the lens apparatus using focal length information of the imaging optical system;
        an acquisition unit that acquires a correction amount based on the second motion information, the vibration detected by the vibration detector, and the reliability information; and
        an image stabilization unit that performs image stabilization control based on the correction amount.

2. The lens apparatus according to claim 1, wherein the first motion information is information obtained by converting a motion vector, which represents a moving amount of an image between a plurality of images captured by an imaging unit of the image capturing apparatus by a number of pixels that form the imaging unit, based on information on the imaging unit.

3. The lens apparatus according to claim 2, wherein the information on the imaging unit includes information on distance between the pixels and an interval at which the plurality of images are captured.

4. The lens apparatus according to claim 1, wherein the first motion information is a moving velocity of a subject image formed by the imaging optical system of the lens apparatus on an image plane of an imaging unit of the image capturing apparatus.

5. The lens apparatus according to claim 1, wherein, in a case where the reliability information represents a reliability lower than a predetermined reliability, the acquisition unit calculates a correction amount based on the vibration detected by the vibration detector without using the second motion information.

6. The lens apparatus according to claim 1, wherein the receiver receives
    first background motion information and first subject motion information as the first motion information, and
    information relating to set image stabilization mode from the image capturing apparatus, and
    wherein the acquisition unit determines which of second background motion information converted from the first background motion information and second subject motion information converted from the first subject motion information is to be used as the second motion information based on the information relating to the image stabilization mode received by the receiver.

7. A lens apparatus used by attaching to an image capturing apparatus comprising one or more processors and/or circuitry which functions as:
    a vibration detector that detects vibration;
    a receiver that receives first motion information from the image capturing apparatus;
    an acquisition unit that acquires a correction amount based on second motion information converted from the first motion information using information of the lens apparatus and the vibration detected by the vibration detector; and
    an image stabilization unit that performs image stabilization control based on the correction amount,
    wherein the receiver receives first background motion information and first subject motion information as the first motion information, and information relating to set image stabilization mode from the image capturing apparatus, and wherein the acquisition unit determines which of second background motion information converted from the first background motion information and second subject information converted from the first subject motion information is to be used as the second motion information based on the information relating to the image stabilization mode received by the receiver.

8. An image capturing apparatus configured to be attached to a lens apparatus, the image capturing apparatus comprising one or more processors and/or circuitry which functions as:

an imaging unit;

a motion detector that detects a motion vector which represents a moving amount of an image between a plurality of images captured by the imaging unit by a number of pixels that form the imaging unit;

a converter that converts the motion vector into first motion information based on information of the imaging unit, and without focal length information on the lens apparatus; and an output unit that outputs the first motion information and reliability information of the first motion information to the lens apparatus, wherein the lens apparatus is capable of converting the first motion information into second motion information in the lens apparatus based on the focal length of the lens apparatus.

9. The image capturing apparatus according to claim 8, wherein the information on the imaging unit includes information on distance between the pixels and an interval at which the plurality of images are captured.

10. The image capturing apparatus according to claim 8, wherein the first motion information is a moving velocity of a subject image formed by an imaging optical system of the lens apparatus on an image plane of the imaging unit.

11. The image capturing apparatus according to claim 8, further comprising a switching unit that switches between a first image stabilization mode and a second image stabilization mode, wherein the motion detector detects a movement of background in the image captured by the imaging unit and a movement of a subject in the image, and the converter obtains a first background motion information converted from the movement of the background based on the information of the imaging unit and a first subject motion information converted from the movement of the subject based on the information of the imaging unit as the first motion information.

12. An image capturing apparatus capable of connecting to a detachable lens apparatus comprising one or more processors and/or circuitry which functions as;

an imaging unit:

a motion detector that detects a motion vector which represents a moving amount of image between a plurality of images captured by the imaging unit by a number of pixels that form the imaging unit;

a converter that converts the motion vector into first motion information based on information of the imaging unit;

an output unit that outputs the first motion information to the lens apparatus; and a switching unit that switches between a first image stabilization mode and a second image stabilization mode, wherein the motion detector detects a movement of background in the image captured by the imaging unit and a movement of a subject in the image, the converter obtains first background motion information converted from the movement of the background based on the information of the imaging unit and first subject motion information converted from the movement of the subject based on the information of the imaging unit as the first motion information, and the output unit outputs the first background motion information and the first subject motion information to the lens apparatus as the first motion information.

13. An image capturing apparatus capable of connecting to a detachable lens apparatus, the image capturing apparatus comprising one or more processors and/or circuitry which functions as;

an imaging unit:

a motion detector that detects a motion vector which represents a moving amount of an image between a plurality of images captured by the imaging unit by a number of pixels that form the imaging unit; and an output unit that outputs motion information including the motion vector, a distance between pixels, a frame rate at which the images are captured, and reliability information of the motion information, to the lens apparatus, without focal length information on the lens apparatus, wherein the lens apparatus is capable of converting the first motion information into second motion information in the lens apparatus based on a focal length of the lens apparatus by the lens apparatus.

14. A control method of a lens apparatus, having an imaging optical system and configured to be attached to an image capturing apparatus, the method comprising:

detecting vibration;

receiving, from the image capturing apparatus, first motion information and reliability information;

converting the first motion information to second motion information in the lens apparatus using focal length information of the imaging optical system;

acquiring a correction amount based on the second motion information, the detected vibration, and the reliability information; and performing image stabilization control based on the correction amount.

15. A control method of a lens apparatus used by attaching to an image capturing apparatus comprising:

detecting vibration;

receiving first background motion information and first subject motion information from the image capturing apparatus as first motion information;

receiving information relating to set image stabilization mode from the image capturing apparatus;

acquiring a correction amount based on second motion information converted from the first motion information using information of the lens apparatus and the detected vibration; and performing image stabilization control based on the correction amount, wherein, upon acquiring the correction amount, which of second background motion information converted from the first background motion information and second subject information converted from the first subject motion information is to be used as the second motion information is determined based on the received information relating to the image stabilization mode.

16. A control method of an image capturing apparatus configured to be attached to a lens apparatus, the method comprising:
    detecting a motion vector which represents a moving amount of an image between a plurality of images captured by an imaging unit by a number of pixels that form the imaging unit;
    converting the motion vector into first motion information based on information of the imaging unit, and without focal length information on the lens apparatus; and
    outputting the first motion information and reliability information of the first motion information to the lens apparatus,
    wherein the lens apparatus is capable of converting the first motion information into second motion information in the lens apparatus based on the focal length of the lens apparatus.

17. A control method of an image capturing apparatus capable of connecting to a detachable lens apparatus comprising:
    detecting a movement of background in an image captured by an imaging unit and a movement of a subject in the image, and detecting a motion vector which represents a moving amount of image between a plurality of images by a number of pixels that form the imaging unit;
    converting the motion vector into first motion information based on information of the imaging unit;
    outputting the first motion information to the lens apparatus; and
    switching between a first image stabilization mode and a second image stabilization mode,
    wherein the first motion information includes a first background motion information converted from the movement of the background based on the information of the imaging unit and a first subject motion information converted from the movement of the subject based on the information of the imaging unit, and
    the first background motion information and the subject motion information are output to the lens apparatus as the first motion information.

18. The image capturing apparatus according to claim 13, wherein the reliability information includes error information of the motion vector and information generated from a transition of camera motion information.

* * * * *